(12) United States Patent  
Difante

(10) Patent No.: US 9,003,633 B1  
(45) Date of Patent: Apr. 14, 2015

(54) CONCRETE ANCHOR BOLT FASTENER AND TOOL AND METHOD FOR INSTALLING

(76) Inventor: Agostino Difante, San Clemente, CA (US)

( * ) Notice: Subject to any disclaimer, the term of this patent is extended or adjusted under 35 U.S.C. 154(b) by 650 days.

(21) Appl. No.: 13/199,118

(22) Filed: Aug. 19, 2011

(51) Int. Cl.
*B23P 11/00* (2006.01)
*B25B 21/00* (2006.01)

(52) U.S. Cl.
CPC .................................... *B25B 21/002* (2013.01)

(58) Field of Classification Search
CPC ........ F16B 13/06; F16B 13/066; F16B 35/00; F16B 35/06; E04C 5/12; E02D 29/0233; E02D 5/76; E02D 5/80; E02D 5/805
USPC .................................... 29/525.02; 411/41, 44
See application file for complete search history.

(56) References Cited

U.S. PATENT DOCUMENTS

2011/0158766 A1* 6/2011 Mitrovic ..................... 411/393

* cited by examiner

*Primary Examiner* — Moshe Wilensky
(74) *Attorney, Agent, or Firm* — William L. Chapin

(57) ABSTRACT

A method for attaching an article to a hardened concrete body includes a tool that has a slotted base plate and a downwardly depending slotted guide cylinder having at the lower end thereof a circular end plate which has a central aperture, insertable into a bore hole to support a rotatably driven shaft disposed through the slot, guide cylinder, and central aperture through said end plate and having at its lower end a cutting head, the shaft being pushed downwardly into the bore and rocked back and forth in the slot, causing the cutting head to form an oval enlargement at the base of the bore hole. An anchor bolt fastener according to the invention is then inserted into the bore hole, the fastener including an elongated shank which has a central shaft bore slidably holding a shaft having at its lower end an expander wedge forcible upwards into a slot extending into a lower end face of the shank to thus expand bolt legs on opposite sides of the slot into the oval bore hole enlargement.

19 Claims, 11 Drawing Sheets

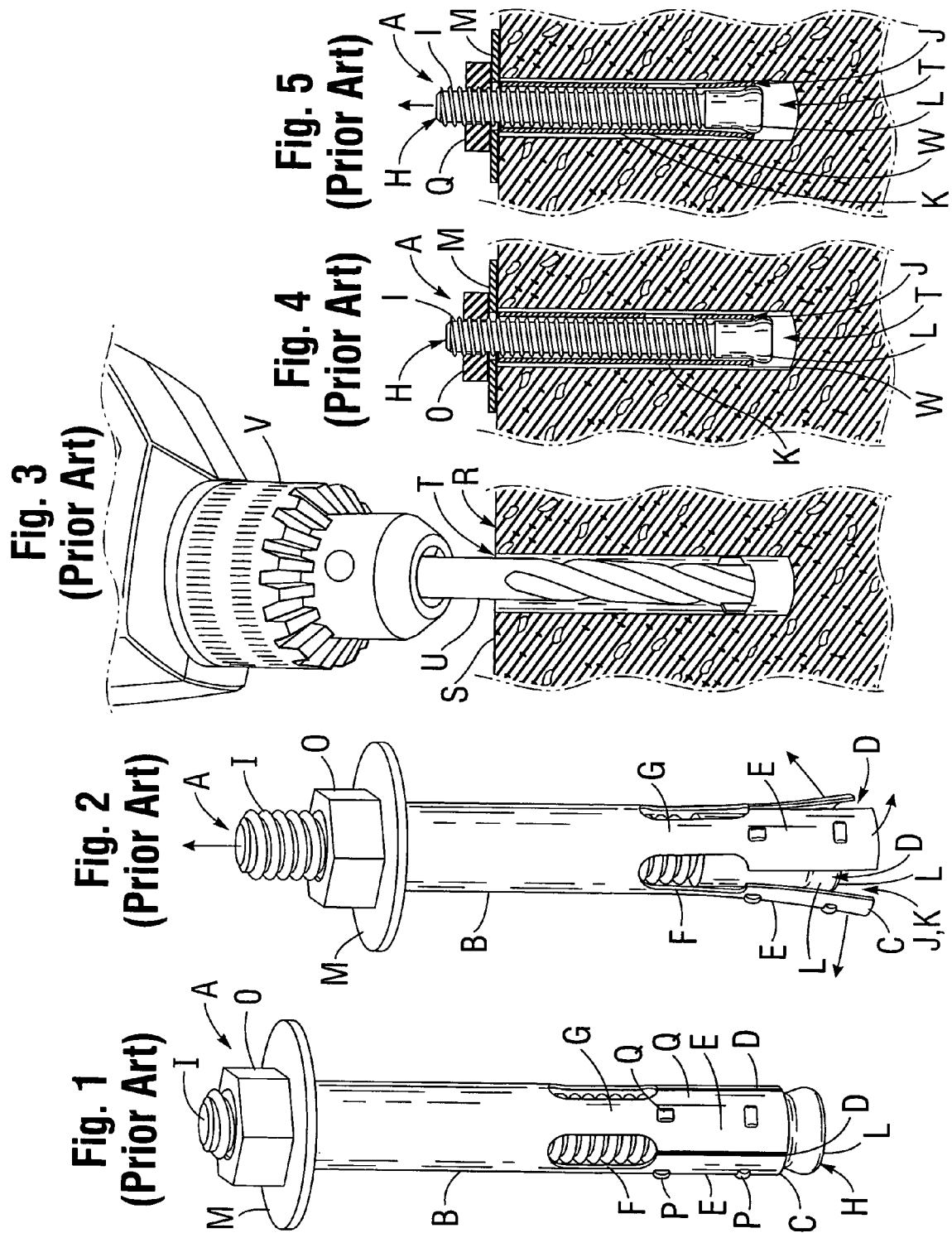

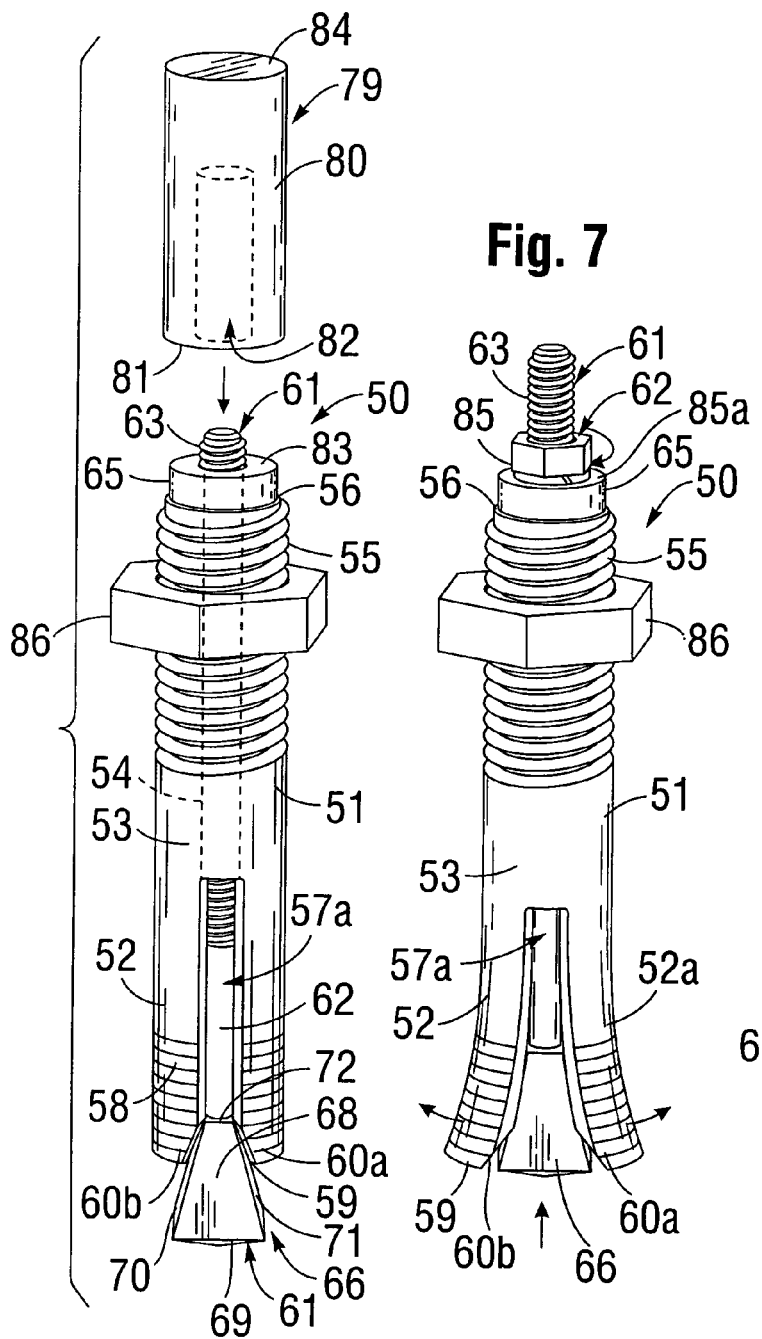

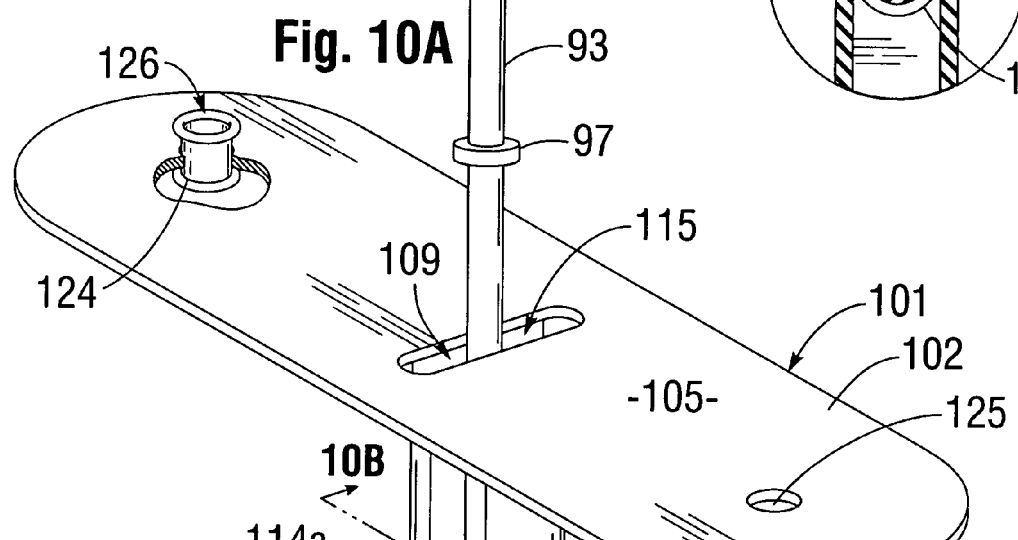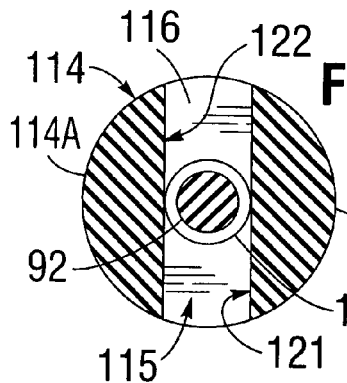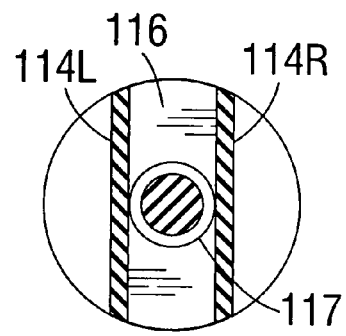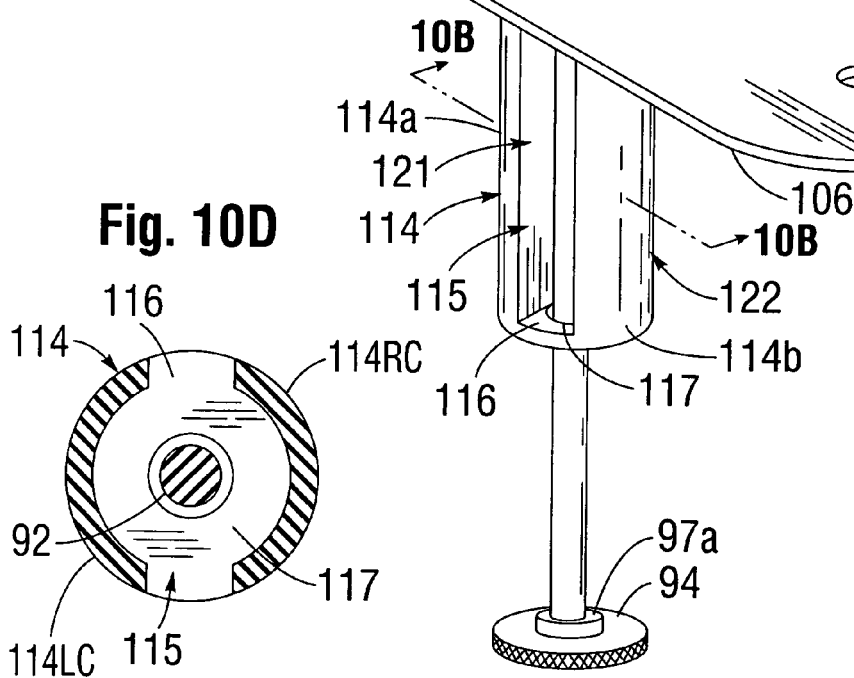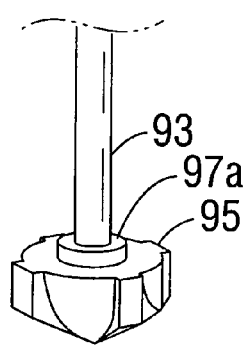

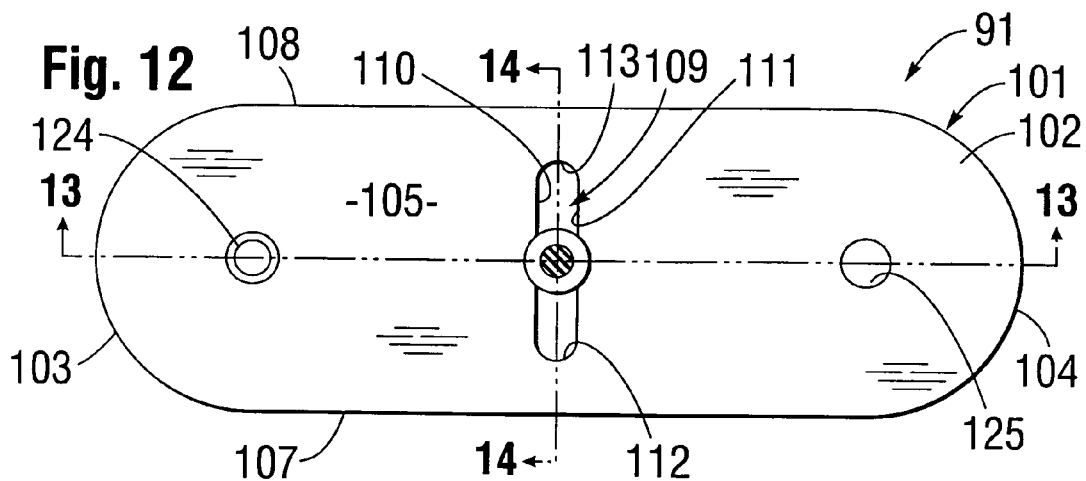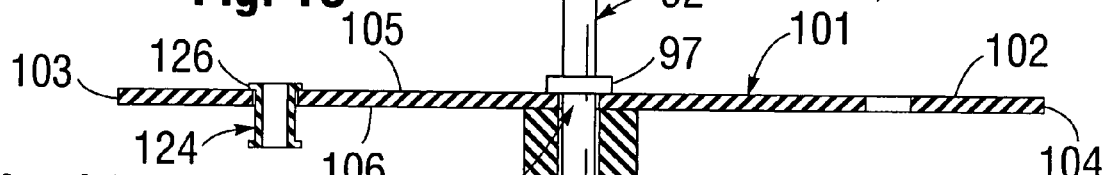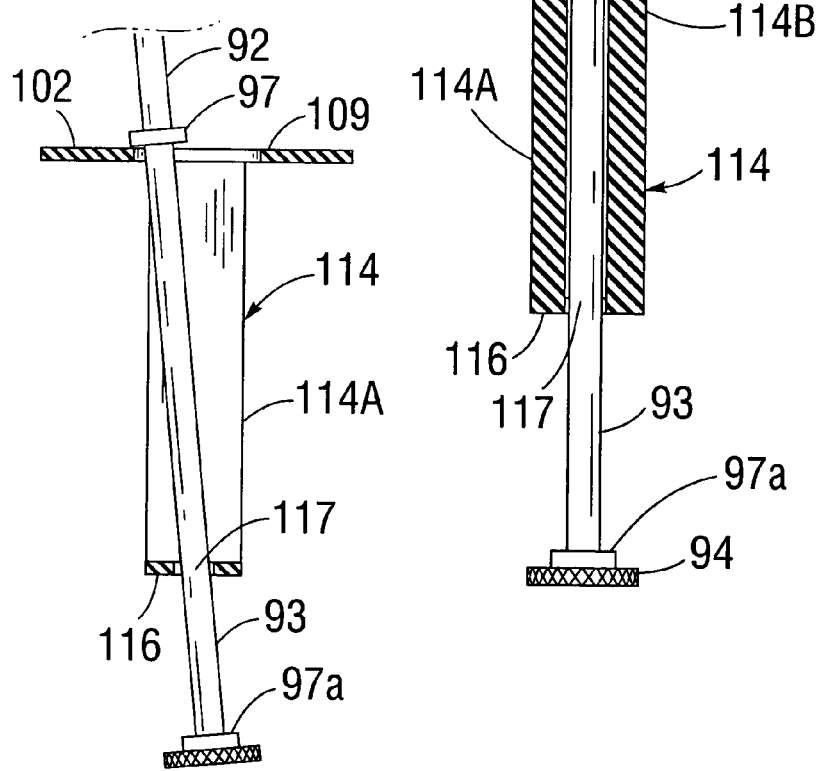

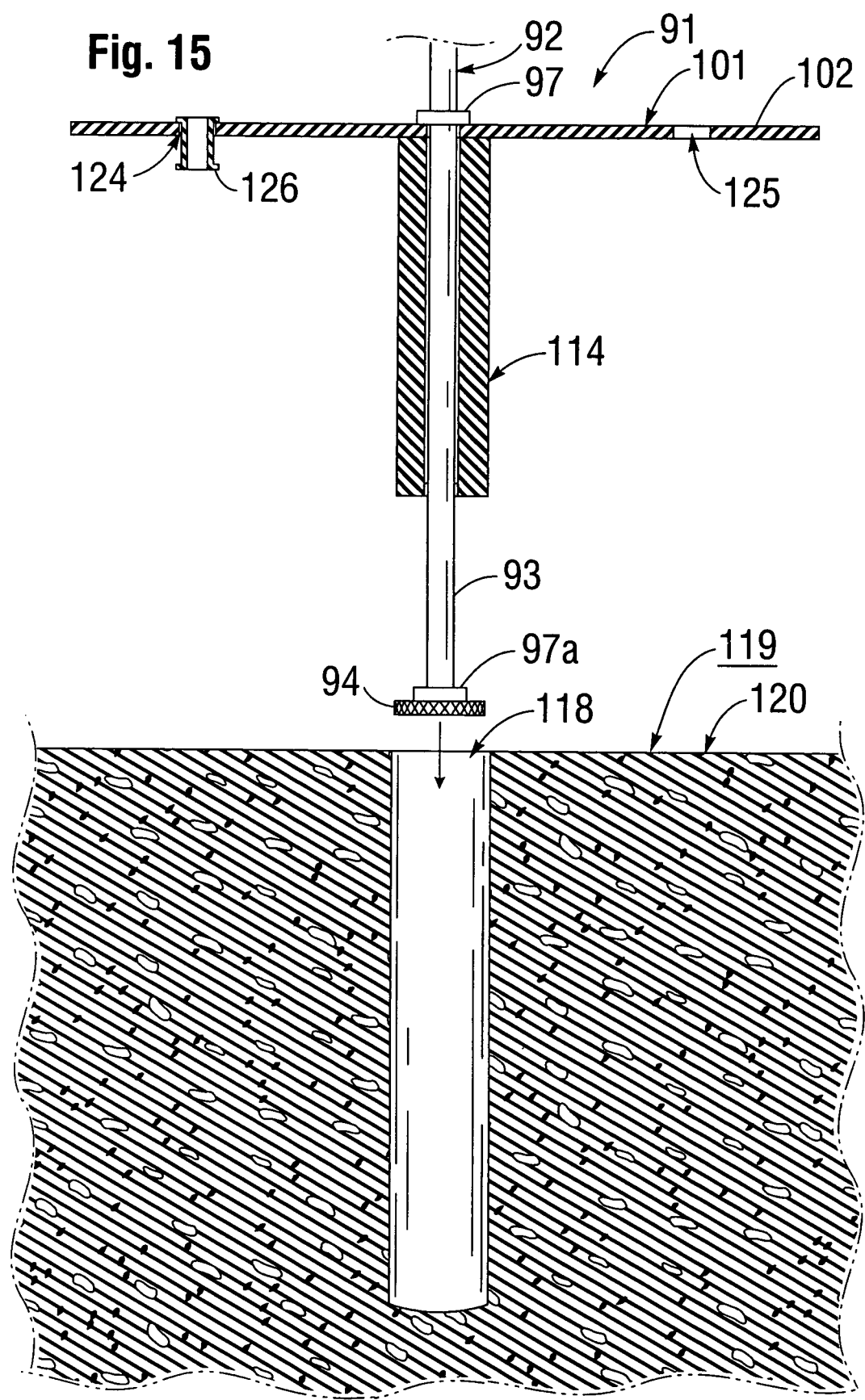

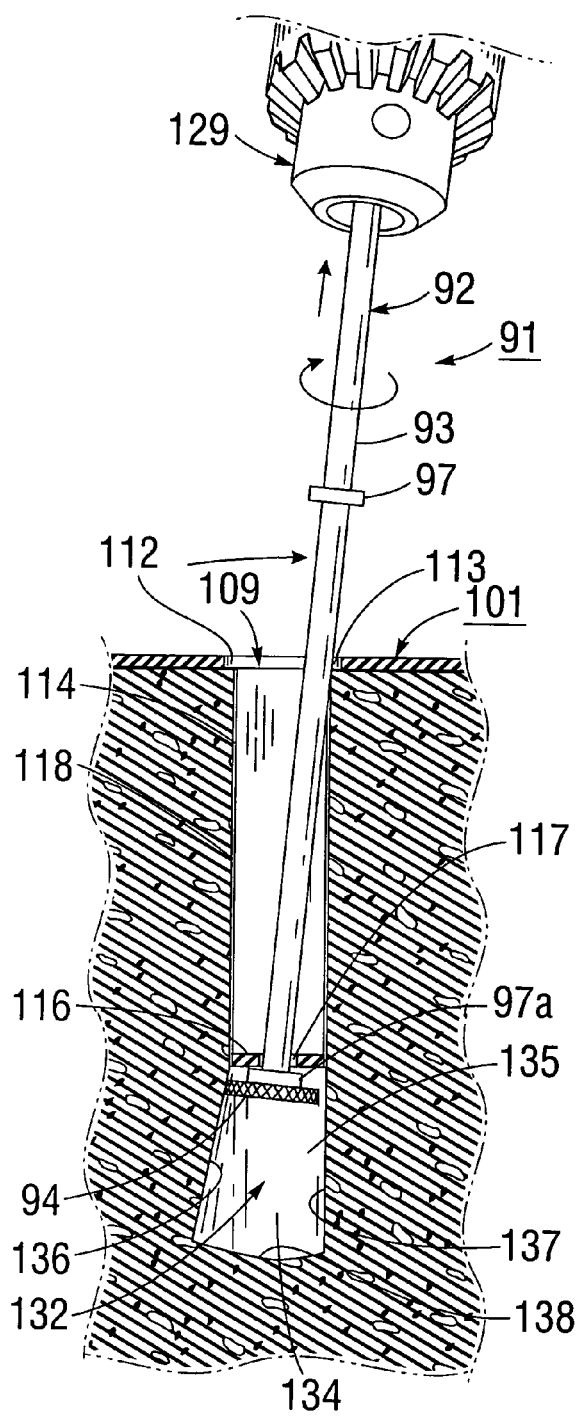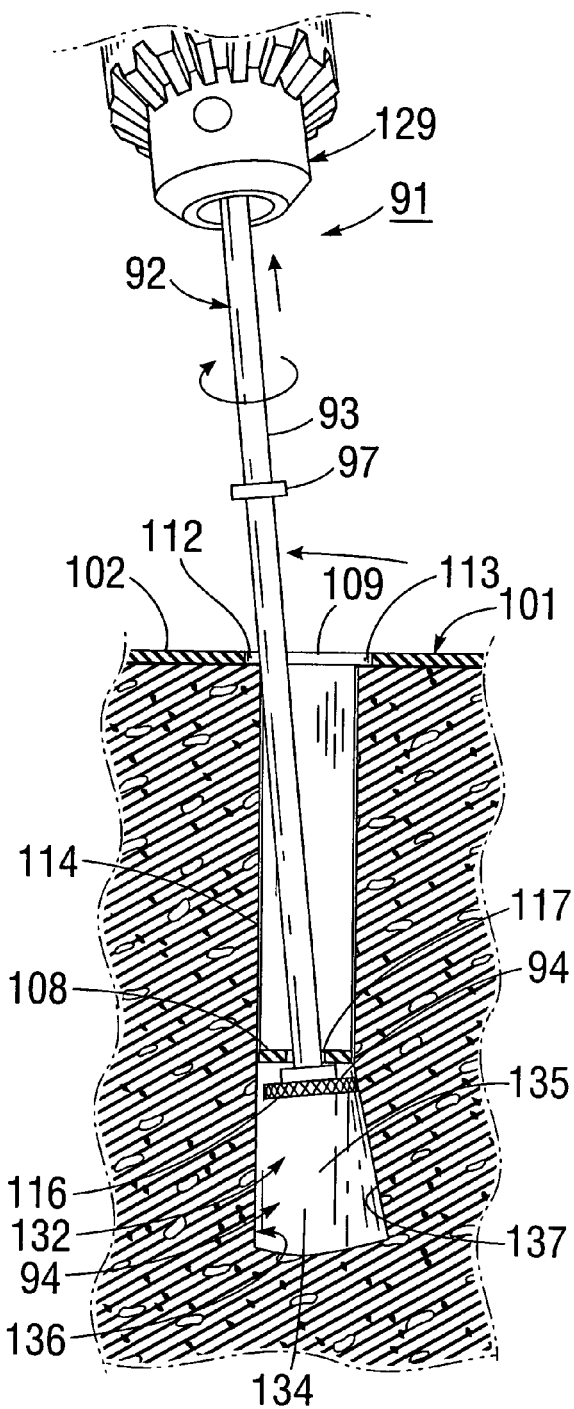

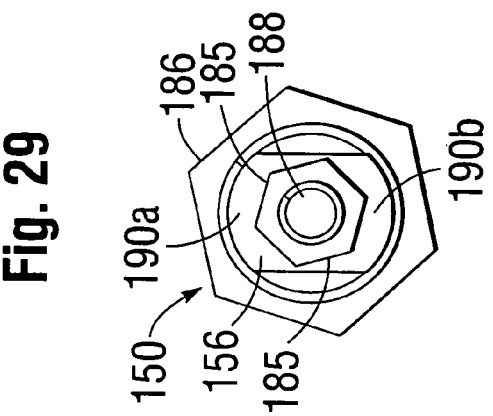
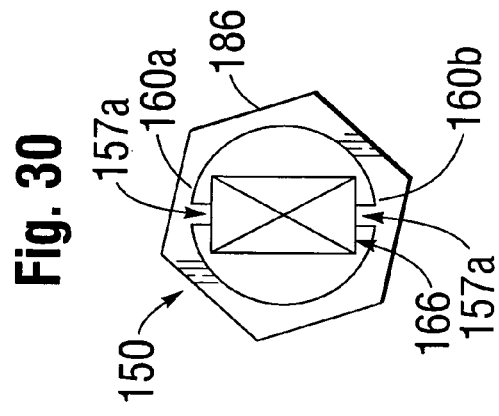
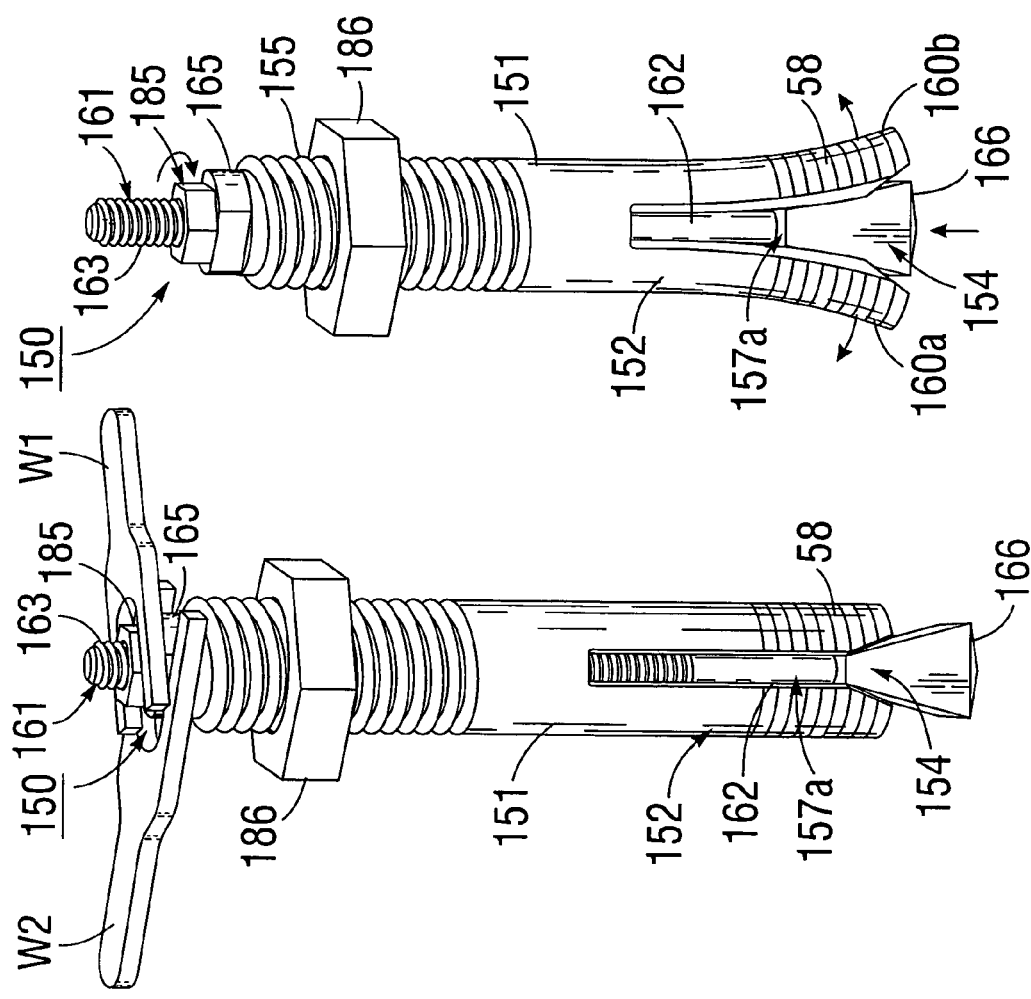

CONCRETE ANCHOR BOLT FASTENER AND TOOL AND METHOD FOR INSTALLING

BACKGROUND OF THE INVENTION

A. Field of the Invention

The present invention relates to fasteners for anchoring objects to concrete bodies such as pediments and precast concrete walls. More particularly, the invention relates to a novel anchor bolt fastener for installation in precast and poured concrete structures, a novel tool and method for cutting a specially shaped hole in hardened concrete which is adapted to receive the novel fastener and a method for installing the fastener in the hole.

B. Description of Background Art there are a wide variety of applications in which it is necessary to install a fastener in a concrete structure after the concrete has been poured and hardened. For example bolts or threaded studs protruding perpendicularly from a concrete pediment, base or wall are installed to support vertically disposed street light standards, power poles or the like, or horizontally disposed structures such as floor beams or posts.

Typical prior art fasteners used for installation in concrete bodies such as a pre-cast pediment or wall are expansion-type fasteners which-include an elongated tubular sleeve that has longitudinally disposed slots which extend upwardly from the lower annular end wall of the sleeve, the slots forming therebetween circumferentially spaced apart, longitudinally disposed legs. The shank of an inverted externally threaded stud or bolt which has a rounded head of larger diameter than a bore disposed longitudinally through the sleeve extends upwardly through the bore and protrudes outwardly from the upper annular end wall of the sleeve. The upper threaded end of the stud or bolt shank also protrudes through a circular washer and is threadably received in a hexagonal nut.

Expansion-type concrete anchor bolt fastener of the type described are installed in a concrete body by first boring perpendicularly into an outer face of the body a circular cross-section hole which has a diameter slightly greater than the head of the stud or bolt located at the lower end of the sleeve. The anchor bolt is inserted into the hole bored into the concrete body with the lower surface of a bearing washer seated on the outer flat surface of the concrete body. The hex nut is then tightened onto the threaded shank of the stud or bolt, thus drawing the head at the bottom of the bolt upwards. Upward tension exerted on the bolt shank causes the rounded bolt head to press upwardly against and enter the lower entrance opening of the sleeve bore, causing lower ends of longitudinally disposed legs of the sleeve to expand radially outward and thus exert radially outwardly directed frictional gripping forces on the inner circumferential wall surface of the concrete bore hole. When the hex nut on the upper end of the bolt shank is tightened sufficiently, a substantial frictional force is exerted on the concrete bore wall by the expanded sleeve legs. Thus, the sleeve and bolt are anchored against being withdrawn from the concrete bore hole by substantial frictional forces exerted by the outer surfaces of the sleeve legs on the concrete bore hole wall surface.

Although prior art expansion type concrete anchor bolt fasteners of the type described above are reasonably effective, the uniform diameter of a concrete bore hole in which the anchor bolt sleeve is installed does not have any abutting surfaces which positively resist tensional forces exerted on the upper end of the bolt that could pull the bolt upwards in the bore hole. Therefore, such prior art concrete anchor bolts can and sometimes do work free from their anchored location in a concrete support structure, and are therefor problematic.

The present invention was motivated in part by the desire to provide a more securely retainable concrete anchor bolt fastener.

OBJECTS OF THE INVENTION

An object of the present invention is to provide improved concrete anchor bolt fasteners, and a tool and method for installing the improved fasteners in hardened concrete.

Another object of the invention is to provide a tool and method for forming at the base of a circular cross-section bore hole in a concrete body an enlarged lower base portion which has an oval cross-section adapted to receive expandable lower portions of the body of an elongated tubular fastener.

Another object of the invention is to provide a tool and method for forming at the base of an elongated circular cross-section bore hole in hardened concrete an enlarged generally oval-shaped cross-section lower base section which is adapted to receive outwardly expandable parts of a tubular fastener member.

Another object of the invention is to provide a tool and method for forming at the base of an elongated circular cross-section bore hole in hardened concrete at least a first radially outwardly disposed enlarged, oval portion of larger diameter than the upper circular cross-section portion of the bore hole, thus giving the bore in a medial vertical sectional view thereof the shape of a generally frusto-conically shaped base section which is truncated at an upper transverse end thereof by a coaxially aligned, elongated upwardly extending circular cross-section cylindrical bore hole section.

Another object of the invention is to provide a tool for forming in the base of an elongated circular cross-section bore hole in a hardened concrete body an oval cross-section enlargement having a major axis larger than the diameter of the circular cross-section bore hole, the tool including a flat fixture base plate for placement on a concrete body, the fixture base plate having through its thickness dimension a transversely disposed, generally rectangularly-shaped guide slot and a longitudinally disposed guide cylinder which protrudes perpendicularly downwardly from the bottom of the fixture base plate, the guide cylinder having front and rear wall sections adjacent to front and rear laterally disposed edges of the guide slot, the bottom end of the guide cylinder supporting a transversely disposed circular end plate having through its thickness dimension a central circular perforation coaxially aligned with the slot in the fixture base plate, and a rotary cutting tool having an elongated straight drive shaft which is disposed vertically through the slot and perforation, the cutting tool having at a lower end thereof a rotary cutting head, the drive shaft having a lower stop collar located above the cutting head, and an upper stop collar affixed to the drive shaft above the fixture base plate, the drive shaft being rotatable and longitudinally movable to thus enable the shaft to be pivoted between opposite ends of the slot, to thereby enable the shaft and rotary cutting head to be rotated, moved longitudinally downwards in said slot and said aperture, and rocked back and forth between lateral edges of the slot to thus form an oval enlargement of the base of the concrete bore hole, the oval enlargement having a major axis aligned with the axis of the slot.

Another object of the invention is to provide a tool and method for forming in hardened concrete at the base an elongated circular cross-section bore hole at least a first radially outwardly tapered, generally oval-shaped base enlargement of larger diameter than the upper circular cross-section portion of the bore hole, thus giving the bore hole in a medial vertical sectional view thereof the shape of a generally frusto-conically shaped base section which is truncated at an upper transverse end thereof by a coaxially aligned, upwardly extending elongated circular cross-section cylindrical section, and a fastener for installation in the bore hole, the fastener including an elongated tubular bolt which has disposed through its length a central longitudinally disposed coaxial shaft bore which communicates at the lower end thereof with a longitudinally disposed slot that penetrates the lower transverse end wall of the bolt and extends upwardly from the lower end wall, the slot forming on opposite sides thereof a pair of longitudinally downwardly disposed legs which are expandable into the enlarged oval base portion of the bore hole to anchor the fastener in the bore hole.

Another object of the invention is to provide a tool and method for forming in hardened concrete at the base an elongated circular cross-section bore hole at least a first outwardly tapered, oval base enlargement of larger diameter than an upper circular cross-section portion of the bore hole, thus giving the bore hole in a medial vertical sectional view thereof the shape of a generally frusto-conically shaped base section which is truncated at an upper transverse end thereof by a coaxially aligned, upwardly extending elongated circular cross-section cylindrical section, and a fastener for installation in the bore hole, the fastener including an elongated tubular bolt which has disposed through its length a longitudinally disposed central coaxial shaft bore which communicates at the lower end thereof with a longitudinally disposed, vertically elongated slot that penetrates the lower transverse end wall of the bolt and extends upwardly from a chamfered wedge shaped entrance opening in the lower end wall, the slot forming on opposite sides thereof a pair of longitudinally disposed, vertically elongated legs which are expandable into the enlarged oval base portion of the bore hole to anchor the fastener in the bore hole, the fastener including an expander member which has an elongated cylindrical shaft longitudinally movable within the central coaxial shaft bore of the bolt, the expander member having at the lower end of the shaft an enlarged flat sided wedge-shaped head that has a cross-sectional shape similar to that of the chamfered lower entrance opening of the slot, the fastener including forcing members adapted to forcibly wedge the wedge-shaped expander member head of the expander member into the entrance opening of the slot at the lower end of the bolt and thus expand the bolt legs into the oval space of the bore hole base.

Another object of the invention is to provide a tool and method for forming in hardened concrete at the base of an elongated circular cross-section bore hole at least a first outwardly tapered, oval base enlargement of larger diameter than the upper circular cross-section portion of the bore hole, thus giving the bore hole in a medial vertical sectional view thereof the shape of a generally frusto-conically shaped base section which is truncated at an upper transverse end thereof by a coaxially aligned, upwardly extending elongated circular cross-section cylindrical section, and a fastener for installation in the bore hole, the fastener including an elongated tubular bolt which has disposed through its length a coaxial shaft bore communicating at a lower end thereof with a longitudinally disposed slot that penetrates the lower transverse end wall of the bolt and extends upwardly from the lower end wall of the bolt, the slot forming on opposite sides thereof a pair of longitudinally downwardly disposed legs which are expandable into the enlarged oval base portion of the bore hole to anchor the fastener in the bore hole, the fastener including an expander member which has an elongated cylindrical shaft longitudinally movable within the shaft bore of the bolt, the expander member shaft having at the lower end thereof an enlarged flat sided wedge-shaped head that has a cross-sectional shape similar to that of a tapered lower entrance opening to the slot located in a base of the bolt, the fastener including forcing members adapted to forcibly wedge the wedge-shaped expander member head into the slot at the lower end of the bolt and thus expand the bolt legs into the oval enlargement of the bore hole base, the forcing members consisting of an impact bushing which is seated on an upper annular end wall of the bolt, and receives upwardly through a central hole in the bushing the upper end of the expander member shaft, and a cylindrical impact collar which has a central blind bore extending upwards from a lower surface thereof to receive the upwardly protruding expander member shaft, and an upper flat surface for receiving hammer blows to drive the bolt body downwards relative to the expander member shaft.

Another object of the invention is to provide a tool and method for forming in hardened concrete at the base of an elongated circular cross-section bore hole which has at a lower base end thereof at least a first outwardly tapered, oval base enlargement of larger diameter than the upper circular cross-section portion, thus giving the bore hole in a medial vertical sectional view thereof the shape of a generally frusto-conically shaped base section which is truncated at an upper transverse end thereof by a coaxially aligned, upwardly extending elongated circular cross-section cylindrical section, and a fastener for installation in the bore hole, the fastener including an elongated tubular bolt which has disposed through its length a coaxial shaft bore which communicates at a lower end thereof with a longitudinally disposed slot that penetrates the lower transverse end wall of the bolt and extends upwardly from the lower end wall of the bolt, the slot forming on opposite sides thereof longitudinally downwardly disposed legs which are expandable into the enlarged oval base portion of the bore hole to anchor the fastener in the bore hole, the fastener including an expander member which has an elongated cylindrical shaft longitudinally movable within the shaft bore of the bolt, the expander member shaft having at the lower end thereof an enlarged, wedge-shaped flat sided head having a cross-sectional shape similar to that of a tapered wedge-shaped lower entrance opening to the slot located in the lower end wall of the bolt, the fastener including forcing members adapted to pull the enlarged wedge-shaped head into the wedge-shaped opening of the slot and thus expand the bolt legs into the oval space of the bore hole base, the forcing members consisting of a bearing collar which is seated on the upper annular end wall of the bolt which receives through the center hole of the bearing collar the protruding externally threaded upper end of the shaft, and a nut threadably tightenable onto the threaded shaft to thus exert a downwardly compressive force on the upper surface of the bearing collar and hence an upwardly directed tensioning force on the shaft which forces the wedge-shaped expander member head to splay the bolt legs apart and into the oval base of the bore hole, thus securing the bolt and expander member from both rotation and longitudinal movement within the bore hole.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a novel concrete anchor bolt fastener for anchoring objects to hardened concrete bodies and structures such as pediments or bases for supporting electrical power transmission or lighting pole standards, pre-cast concrete walls and floors and the like, and a novel tool and method for installing the fasteners Preferred embodiments of the novel fasteners according to the present invention may be used as replacements for prior art concrete bolt anchors and thus include an externally threaded bolt shank or stud which protrudes perpendicularly from a concrete structure in which the novel fastener is installed. Objects such as standards of power poles or street lamps which are to be fastened to the concrete structure are thus fastenable by conventional means as for example by receiving the protruding threaded shanks of four fasteners arranged in a square through holes of a power pole base plate and securing the base plate in place by installing nuts on the threaded shanks and tightening the nuts down against the outer surface of the base plate.

According to one aspect of the invention, a hole is bored perpendicularly into a hardened concrete body, the hole having an elongated upper section which has a conventional uniform circular cross-section. Then, according to the invention, a conventional uniform circular cross-section bore hole for receiving an anchor bolt is modified by forming at the bottom end of the cylindrically-shaped anchor bolt bore hole an elongated, generally, oval-shaped base enlargement or extension which has a minor axis of approximately the same length as the diameter of the circular upper part of the bore hole, and a major axis of greater length than the diameter of the circular upper part of the bore hole. Preferably, the elongated enlarged diameter oval part of the bore hole base extension lies symmetrically on a diameter of the circular upper part of the bore hole, and extends equal distances radially outwards of opposite diametrically opposed sides of the upper circular portion of the bore hole. Within this construction, the modified anchor bolt bore hole according to the present invention has in a vertical medial sectional view a shape approximating that of the frustum of a cone which is terminated at an upper transverse end thereof by a coaxially aligned, perpendicularly upstanding circular cylinder which has the same diameter as the upper diameter of the truncated cone.

According to another aspect of the invention, a tool for forming the novel tapered anchor bolt bore hole described above is provided.

A tool according to the invention for forming the base of a cylindrically-shaped concrete anchor bolt fastener bore hole in a concrete body includes a jig or fixture for placement on the surface of a concrete body in which a conventionally shaped uniform circular cross-section bore hole has previously been made. The fixture for making an enlarged oval base in a bore hole according to the present invention includes a flat metal base plate. The base plate has protruding perpendicularly downwardly from the center thereof a tubular circular cross-section guide cylinder which has an outer diameter equal to that of a previously formed bore hole, and a pre-determined length slightly less than the depth of the bore hole, so that the guide cylinder can be inserted into the bore hole with the lower surface of the base plate seated on the outer surface of the concrete body in which the bore hole is formed. The guide cylinder has at the lower end thereof a circular end plate which has through its thickness dimension a coaxially centered circular clearance hole for receiving the rotating shaft of a rotary cutting tool, the inner circumferential wall of the circular clearance hole forming a fulcrum or pivot surface for the rotating shaft.

The base plate of the fixture for modifying a cylindrical bore hole to have a radially outwardly tapered lower end portion having an oval cross-section, enlarged diameter base includes a rectangular perforation or slot through the base plate, which is centered between and disposed perpendicularly to front and rear long edges of the base plate. The slot has the same width as the diameter of the tool shaft guide hole through the bottom end plate of the guide tube cylinder, and has a length slightly larger than the diameter of the concrete bore hole.

The guide cylinder has through front and rear wall surfaces thereof longitudinally disposed vertical slots which are vertically aligned with front and rear sides of the base plate slot, but are of slightly greater width. The front and rear longitudinally disposed vertical guide cylinder slots extend from the upper surface of the bottom end cap of the guide cylinder, and through the upper annular end wall of the guide cylinder, to the lower surface of the fixture base plate.

The tapered anchor bore hole forming tool according to the present invention includes a cutting tool which has a rotary cutting head and an elongated drive shaft which extends perpendicularly upwards form the center of the cutting head. The cutting head is located below the bottom circular end plate of the fixture guide cylinder, at the lower end of the drive shaft, which extends upwardly through the circular guide hole through the circular end plate, and upwardly through the rectangular guide slot through the fixture base plate. That portion of the cutting tool drive shaft which protrudes above the fixture base plate has attached to it outer circumferential wall an upper stop collar of larger outer diameter than the width of the slot through the fixture base plate. Contact of the lower surface of the upper stop collar with the upper surface of the fixture base plate limits downward motion of the tool drive shaft and hence the depth of a modified bore hole which may be made using the fixture and rotary power source turning the drive shaft of the cutting tool. Preferably, the cutting tool drive shaft also has a lower collar on the upper surface of the cutting head to limit upward movement of the cutting head so that it does not contact the guide cylinder.

The base plate of the fixture according to the present invention preferably has at least one and most preferably two indexing guides spaced apart from the center of the base plate. The purpose of the indexing guides is to enable the base plate to be oriented and secured to concrete surfaces in a known direction, so that the orientation of the major axis of an oval enlargement of a bore hole made using the tool can be readily determined.

The bore enlarging tool according to the present invention is used by retracting the rotary cutting tool shaft fully upwards until the cutting head abuts the lower surface of the fixture guide cylinder bottom end plate. The guide cylinder and cutting tool are then inserted as a unit into a previously formed, cylindrical bore hole. Rotary drive power is then applied to the upper end of the cutting tool drive shaft, by an electric power drill, for example. The shaft is then pushed downwardly with the shaft angled so that it presses against a front or rear edge of the rectangular guide slot in the base plate of the fixture, clearance for that part of the cutting tool drive shaft below the base plate being provided by the front and rear vertical guide cylinder slots. Downward boring motion is continued until the stop collar limits further downward movement of the cutter head. As a result of the foregoing actions, a radially outwardly tapered, oval enlargement is formed at the base of the originally formed, uniform circular cross-section bore hole. The enlargement has an oval shape, the major axis of which is aligned with the rectangular slot through the base plate of the fixture. The drive shaft and cutting tool are then retracted from the hole to their upward movement limits, the drive shaft is then angled to impact the opposite, e.g., rear edge of the guide plate, and the downward boring step repeated, thus forming an oval bore enlargement which extends equal radial distances from the bore center line.

According to the present invention, two related embodiments of a novel fastener are provided for installation in a concrete anchor bolt bore hole modified by the method and tool described above. One embodiment of a novel fastener according the present invention includes an elongated tubular bolt which has at the lower end thereof a longitudinally disposed slot that penetrates the lower end wall of the bolt and extends upwardly from the lower end wall of the bolt, the slot forming on opposite sides therein longitudinally a pair of downwardly disposed legs which are expandable into the enlarged oval base portion of the bore hole to anchor the fastener in the bore hole, the fastener including within the bore of the bolt an expander member including an elongated cylindrical shaft which has at the lower end thereof an enlarged flat sided wedge-shaped head which has a cross-sectional shape similar to that of the tapered lower base portion of the bore hole, the fastener including forcing members adapted to force the wedge-shaped head into the slot of the bolt and thus expand the bolt legs into the oval space of the bore hole base, the forcing members consisting of an impact bushing which is seated on an upper annular end wall of the sleeve, and receives upwardly through a central hole in the bushing the upper end of the expander member shaft, and a cylindrical impact collar which has a central blind bore extending upwards from a lower surface thereof to receive the upwardly protruding shaft, and an upper flat surface for receiving hammer blows to drive the sleeve body downwards relative to the expander member shaft.

A second embodiment of a novel fastener according to the present invention includes an elongated tubular bolt which has at the lower end thereof a longitudinally disposed slot which penetrates the lower end wall of the bolt wall and extends upwardly from the lower end wall of the bolt, the slot forming on opposite sides thereof a pair of longitudinally downwardly disposed legs which are expandable into the enlarged oval base portion of the bore hole to anchor the fastener in the bore hole, the fastener including within the bore of the bolt an expander member including an elongated cylindrical shaft which has at the lower end thereof an enlarged, wedge-shaped flat sided head having a cross-sectional shape similar to that of the tapered lower base portion of the bore hole, the fastener including forcing members adapted to force the enlarged wedge-shaped head into the slot of the bolt and thus expand the bolt legs into the oval space of the bore hole base, the forcing members including a milled polygonal cross-section bearing collar head fixed to the upper annular end wall of the bolt which receives through a center hole of the collar head the protruding externally threaded upper end of the shaft, and a nut threadably tightenable onto the threaded shaft to thus exert a downwardly compressive force on the upper surface of the bearing collar, and hence an upwardly directed tensioning force on the shaft. Preferably, the bearing collar head is a milled, integral part of the fastener bolt body.

BRIEF DESCRIPTION OF THE DRAWINGS

FIG. 1 is a perspective view of a prior art expansion-type concrete bolt fastener.

FIG. 2 is a view similar to FIG. 1, but showing the bolt tensioned to radially expand lower leg segments of the fastener sleeve.

FIG. 3 is a sectional view showing a hole being bored in a concrete structure for receiving the fastener of FIG. 1.

FIG. 4 is a sectional view showing the fastener of FIG. 1 inserted into a bore hole formed as shown in FIG. 3.

FIG. 5 is a sectional view showing a nut of the fastener of FIG. 4 tightened onto the protruding threaded shank of an anchor bolt of the fastener to radially expand lower leg segments of the fastener sleeve into anchoring contact with the inner circumferential wall surface of the bore hole.

FIG. 6 is a perspective view of an impact installable concrete anchor bolt fastener according to the present invention, showing an impact anvil collar tool useable to install the fastener.

FIG. 6A is a fragmentary vertical medial sectional view of the fastener of FIG. 6.

FIG. 7 is a view similar to FIG. 6, but showing a tubular bolt part of the fastener driven downwardly on a central expander shaft of the fastener and showing a nut tightened on the threaded shank of the expander shaft which protrudes upwardly through the impact bushing of the fastener.

FIG. 8 is an upper plan view of the fastener of FIG. 7.

FIG. 9 is a lower plan view of the fasten er of FIG. 7.

FIG. 10A is a perspective view of a novel concrete bore hole enlargement tool for use with the fastener of FIGS. 6-9.

FIG. 10B is a transverse sectional view of the tool of FIG. 10A, taken in the direction of line 10B-10B.

FIG. 10C is a transverse sectional view of a first modification of the tool of FIG. 10B.

FIG. 10D is a transverse section view of a second modification of the tool of FIG. 10B.

FIG. 11 is a perspective view of a carbide drill bit for use with the hole forming tool of FIG. 10A.

FIG. 12 is an upper plan view of the tool of FIG. 10A.

FIG. 13 is a vertical medial sectional view of the tool of FIG. 12, taken in the direction of the line 13-13.

FIG. 14 is another vertical medial sectional view of the tool of FIG. 12, taken in the direction of the line 14-14.

FIG. 15 is a vertical medial sectional view of the tool of FIGS. 12 and 13, showing the tool positioned above a straight, uniform circular cross-section bore hole formed in a concrete structure.

FIG. 19 is a perspective view showing a guide slot of the base plate template of the tool of FIG. 12 being used to guide the shaft of a rotary cutting wheel in forming a leftward angled expansion of the lower base end of a cylindrical bore hole made in a concrete structure.

FIG. 20 is a view similar to FIG. 19, showing the tool used to guide formation of a rightward angled expansion of the lower end of the bore.

FIG. 27 is a perspective view of an alternate embodiment of the fastener of FIG. 6, which is expanded by torque.

FIG. 28 is a view similar to FIG. 27, showing a lower slotted end of the fastener fully expanded.

FIG. 29 is an upper plan view of the arrangement of FIG. 28.

FIG. 30 is a lower plan view of the arrangement of FIG. 28.

DESCRIPTION OF THE PREFERRED EMBODIMENTS

Figure 16:
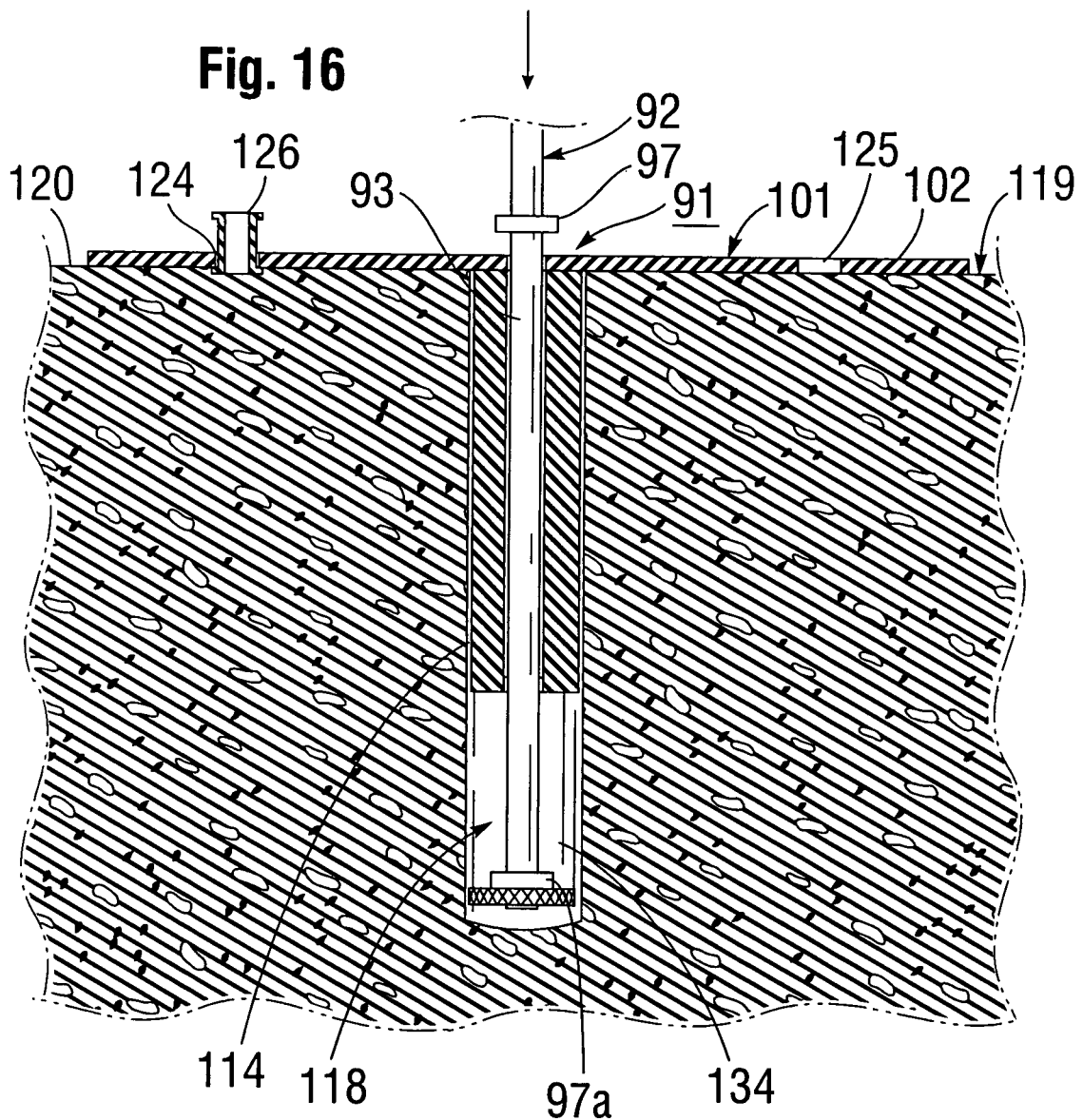
FIG. 16 is a view similar to FIG. 15, showing the tool installed in the bore hole.

FIGS. 1-5 illustrate the construction and function of an expansion type prior art concrete anchor bolt fastener.

FIGS. 6-30 illustrate to construction and function of a novel concrete anchor bolt fastener, and a novel tool and method for installing the fastener according to the present invention.

FIG. 1 shows a prior art expansion-type concrete anchor bolt fastener A that includes an elongated thin-wall tubular metal sleeve B which has a circular cross-section. Sleeve B has extending longitudinally upwards from the lower transverse annular end wall C thereof a plurality of circumferentially spaced apart slots D which form therebetween longitudinally downwardly disposed legs E. The slots have widened upper ends F, thus narrowing the upper portions G of the legs. A stud or bolt H which has an externally threaded shank I is insertably received into the lower opening J of a longitudinally disposed bore K through sleeve B. Bolt H has a rounded doughnut-shaped head L which has a larger diameter than bore K, and thus limits upward motion of shank I in bore K of sleeve B. Fastener A includes a flat annular ring-shaped bearing washer M of larger outer diameter than sleeve B, which is seated on the upper transverse annular end wall of the sleeve, and a hex nut O which is seated on the upper surface of the bearing washer and is threadably tightenable on the upwardly protruding shank I of bolt H. As shown in FIGS. 1 and 2, fastener A may have friction enhancing rectangular bosses P which protrude outwardly from the outer wall surfaces Q of legs E.

FIGS. 3-5 show how prior art concrete anchor bolt fastener A is installed in a concrete body R, such as a pediment or base for the standard of a street light, sign, electrical power distribution pole, telephone pole or the like. As shown in FIG. 3, a bore hole T is bored perpendicularly inwards from the surface S of concrete body T into the body to a depth slightly greater than the length of fastener sleeve B. Bore hole T has a uniform diameter slightly larger than the outer diameter of sleeve B, and is formed using a suitable drill bit U powered by a rotary power tool V such as an electric drill.

Next, as shown in FIG. 4, a prior art fastener A is inserted into bore hole T, the lower surface of a bearing washer M seating on surface S of concrete body R. Finally, as shown in FIG. 5, hex nut O is tightened on shank I of bolt H. As may be understood by referring to FIG. 2 in addition to FIG. 5, tightening nut O on shank I of bolt H draws doughnut-shaped enlarged head L of bolt H upwardly into compressive contact with lower entrance opening J of bore K through the sleeve, thus causing head L to enter bore K and force sleeve legs E radially outwards into frictionally gripping contact with the inner circumferential wall surface W of bore hole T, thus retaining the fastener frictionally within the bore hole.

FIGS. 6-9 illustrate a basic impact-type embodiment of a novel concrete anchor bolt fastener according to the present invention, which is described immediately below, while FIGS. 26-29 illustrate a torque-type embodiment of the invention, which is described further below.

As shown in FIG. 6, an impact-type embodiment 50 of a novel concrete anchor bolt fastener according to the present invention includes a longitudinally elongated tubular metal body 51, which preferably is fabricated from the shank of a steel bolt. Body 51 has a lower expandable slotted section 52 which has smooth or preferably ridged outer walls 53. As shown in FIGS. 6 and 9, lower slotted section 52 of fastener body 51 has a uniform diameter circular cross-section and a uniform diameter, circular bore 54 which extends through the entire length of the body. As shown in FIG. 6, body 51 of fastener 50 has an upper externally helically threaded section 55 which is axially aligned with lower section 52. Upper threaded section 55 of body 51 is a coaxially aligned extension of lower section 51, and has an upper transverse annular end wall 56 which is coextensive with upper end wall of body 51.

As shown in FIGS. 6 and 9, lower expandable slotted section 52 of fastener 50 has at least one pair of vertically elongated, rectangularly-shaped slots 57A, 57B which penetrate the cylindrical wall 58 of fastener body 51 at diametrically opposed locations, e.g., front and rear or left and right sides of the wall. As shown in FIG. 6, slots 57A, 57B penetrate and extend perpendicularly upwards from the lower transverse annular end wall 59 of body 51, and form therebetween outwardly convex, arcuately curved longitudinally disposed diametrically opposed legs, 60A, 60B, e.g., left and right or front and rear legs. Preferably, legs 60A, 60B have on outer surfaces thereof a series of longitudinally spaced apart ring-shaped gripping ridges 58A.

Referring to FIGS. 6, 8 and 9, it may be seen that impact-type concrete anchor bolt fastener 50 includes a longitudinally disposed expander member 61 which extends axially through bore 54 of fastener body 51. As shown in the figures, expander member 61 includes an elongated cylindrical shaft 62 which has an upper section 63 that has external helical threads. As shown in FIGS. 6 and 8, the externally threaded upper section 63 of expander member shaft 62 is received through a central clearance hole 64 of a circular ring-shaped flat washer or bushing 65 which seats on upper transverse end wall 56 of fastener body 51. Alternately and preferably, ring-shaped flat washer 65 is replaced by a similarly-shaped, milled upper end portion of body 51.

Referring to FIGS. 6, 6A, 7 and 9, it may be seen that expander member 61 has located at the lower end thereof an axially centered expander head 66. As shown in the lower end view of FIG. 9, expander head 66 has the shape of a prism having flat and parallel front and rear surfaces 67, 68, which are spaced equidistant from the axis of expander member shaft 62. As shown in FIG. 6, expander head 66 has in front elevation view the shape of a regular trapezoidal body, including a flat, rectangularly-shaped horizontally disposed long lower base 69, left and right sides 70, 71, which are of equal length and angle upwardly and inwardly at equal angles from the base, and a rectangular horizontally disposed short upper base 72 which conformally joins the lower end of expander member shaft 62.

Figure 23:
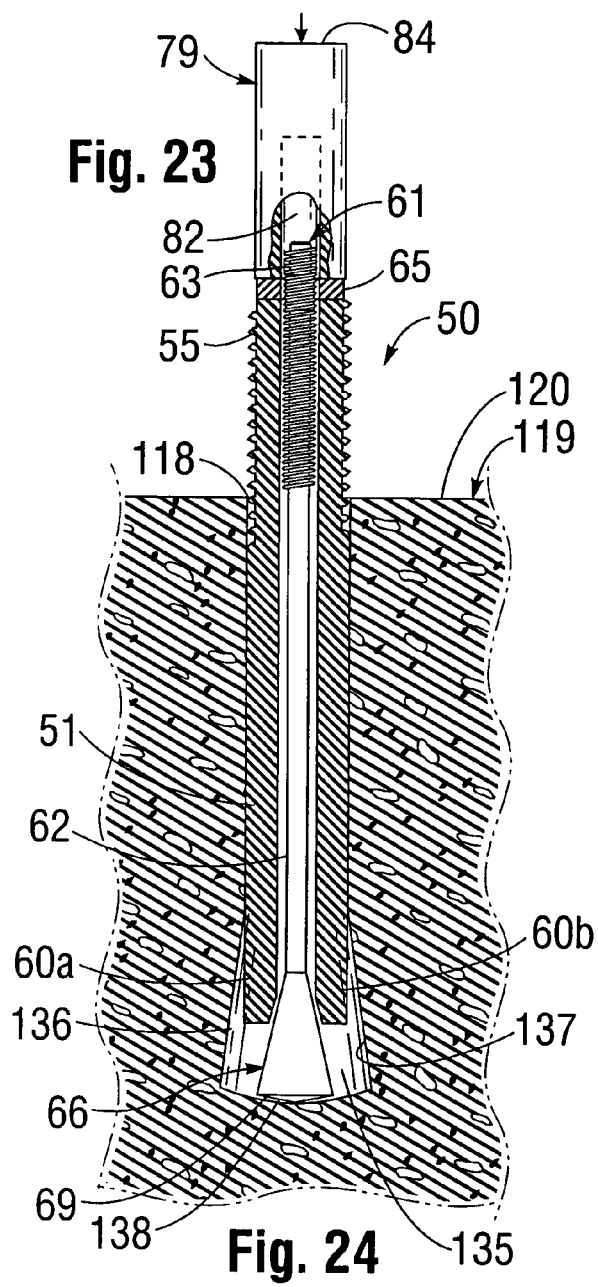
FIG. 23 is a view similar to FIG. 22, but showing the fastener inserted into the tapered bore hole and an impact anvil collar positioned at the upper end of the fastener preparatory to striking the upper end face of the impact anvil collar to thus drive the fastener bolt downwards relative to a central expander shaft and wedge of the fastener bolt.
Figure 24:
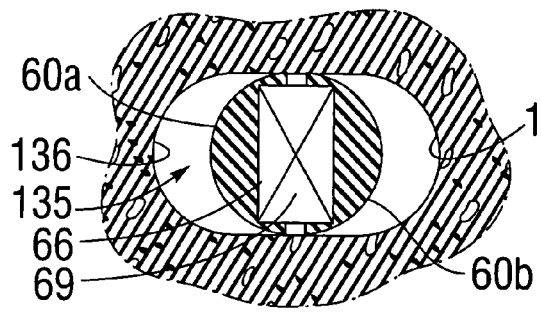
FIG. 24 is a lower horizontal sectional view of the arrangement of FIG. 23.

As may be envisioned by referring to FIGS. 6 and 7, if the base 69 of expander head 66 is fixed against downward vertical movement, as for example by resting on the bottom of a concrete bore hole, as shown in FIG. 23, driving body 51 of fastener 50 downwards relative to expander member shaft 62 and expander head 66 causes the sloping, wedge-shaped sides 70, 72 of the expander head to forcibly enter slots 57A and 57B at the lower entrance opening 78 of bore 56 disposed coaxially through fastener body 51. Wedging entry of expander head 66 into bore 54 of body 51 in turn forces left and right legs 60A, 60B to splay outwards, as shown in FIG. 7.

FIG. 6 illustrates an impact collar 79 which may be used to facilitate driving fastener body downwards relative to expander member head 66 to splay legs 60A, 60B outwards as shown in FIG. 7. As shown in FIG. 6, impact collar 79 consists essentially of a cylindrical body 80 which is made of a durable, impact resistant material such as steel. Body 80 has extending longitudinally inwards from lower face 81 thereof a coaxially located blind smooth bore 82 of somewhat larger diameter than upper externally threaded section 63 of expander member shaft 62.

As shown in FIG. 6, impact collar 79 is used by placing lower annular face 81 of the collar on the upper face 83 of impact washer 65, with the upper threaded end 63 of expander member shaft 62 received in blind bore 82 of the impact collar. The upper flat surface 84 of impact collar 79 is then struck with a hammer to drive body 51 of fastener 50 downwards relative to expander member shaft 62 and expander head 66, thus causing the expander head to spread legs 60A, 60B outwardly apart, as shown in FIG. 7. Impact washer 65 may then be removed, or optionally, as shown in FIG. 7, secured in place by tightening a hex nut 85 onto threaded section 63 of the expander member shaft.

In a preferred embodiment, in which washer 65 is a milled part of fastener body 52, the expander head 66 is secured in place by tightening a hex nut 85 and a lock washer 85A onto threaded section 63 of the expander member shaft 62 thus fixing the location of expander head 66, and fixing the expanded legs 60A and 60B in place so that they cannot return to their original configuration.

Figure 25:
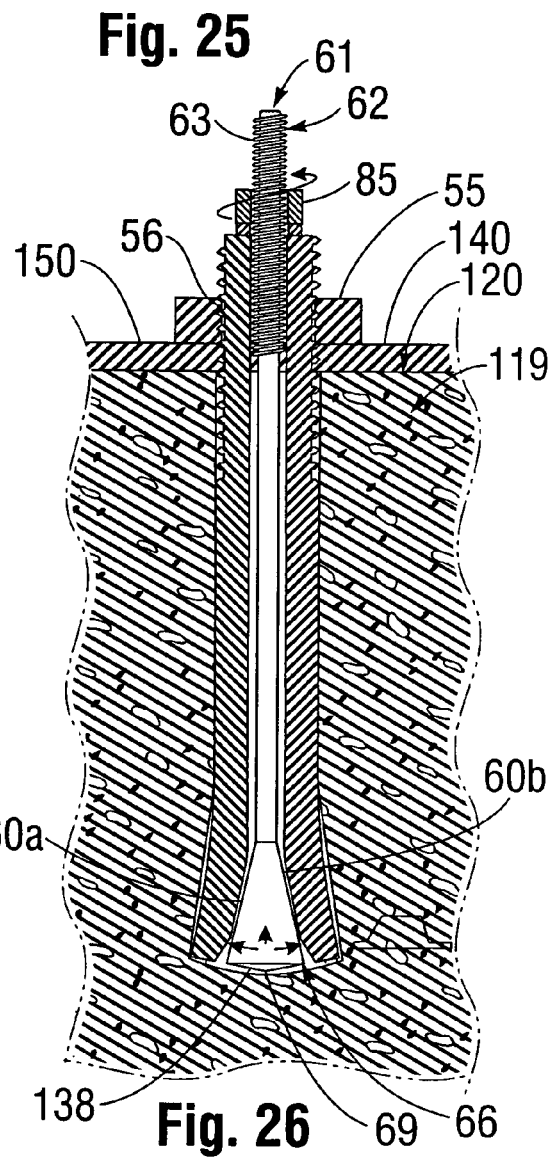
FIG. 25 is a view similar to FIG. 23, but showing the bolt of the fastener having been driven by impact to the bottom of the tapered bore hole, and the base plate of an object fastened to the bolt.
Figure 26:
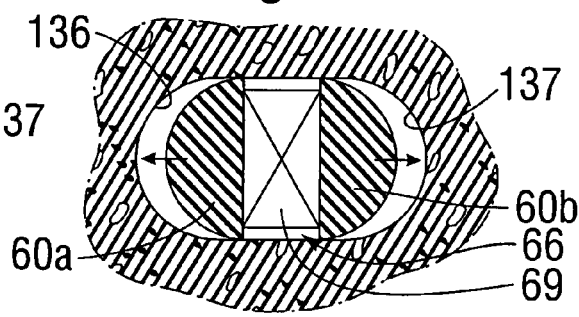
FIG. 26 is a lower horizontal sectional view of the arrangement of FIG. 25, showing the expanded legs of the tubular fastener bolt.

As shown in FIGS. 6 and 7, tubular bolt 50 preferably is provided with a hexagonal main ring nut 86 which is threaded onto the externally threaded upper section 55 of body 51, the lower surface of the ring nut 86 abutting the upper surface 150 of an object 140 to be secured on the upper surface 120 of a concrete body 119, as shown in FIG. 25. At this point by tightening nut 86 compressive forces are placed on the top surface of legs 60A and 60B against the top surface of the tapered elongated oval formed hole. The legs 60A and 60B are prevented from returning to their original position due to hexagonal nut 85. As nut 86 is tightened, the body 51 of fastener 50 tends to retract itself from the bored hole. This is prevented due to the fact that the wedge 66 is secured in place by expansion member shaft 62 and nut 85, thus creating a united fastener that would have to retract in its entirety from the hole. This is not possible due to the fact that the lower portion of the united fastener is bigger than the diameter of the hole.

Preferably, as shown in FIGS. 6 and 8, the upper face 83 of milled section 65 of body 51 has marked or engraved thereon centered index lines 90A and 90B of which are parallel and directly in line above slots 57A and 57B. Wedge 66 is manufactured and installed in place along top flat portion of wedge inserted in slots 57A and 57B. When fastener 50 is inserted into bore hole, the index lines 90A and 90B signify that the legs 60A and 60B are oriented to expand left to right in the elongated oval formed hole.

FIGS. 10A-14 illustrate a novel tool 91 according to the present invention for forming an oval elongated enlargement in the base section of a concrete bore hole. As shown in FIGS. 10A and 11, tool 91 includes a rotary cutting tool 94 adapted to cutting concrete, the tool having an elongated straight cylindrically-shaped steel shaft 93 that has at the lower end thereof a transversely disposed cutting head 94 centered on the shaft. As shown in FIG. 10A, cutting head 94 has the shape of a circular cutting wheel. Alternatively, as shown in FIG. 11, a carbide drill bit 95 may be fitted to the shaft 93. As shown in FIG. 10A, shaft 93 has attached coaxially to the outer circumferential surface 96 thereof an upper stop collar 97 which, as will be explained below, limits the downward vertical travel of the cutting tool 92 to a pre-determined depth, and a lower stop collar 97A to limit upward vertical travel of cutting tool 94.

Concrete bore hole shaping tool 91 according to the present invention also includes a jig or fixture component 101 which functions as a guide for positioning rotary cutting tool in the formation of an elongated, generally oval-shaped enlargement at the base section of a concrete bore hole. As shown in FIGS. 10, 12 and 13, cutting tool guide fixture 101 includes a flat, laterally elongated generally rectangular-shaped metal base plate 102 which preferably has rounded, arcuately curved left and right sides 103, 104. Base plate 102 has a flat and parallel upper and lower surfaces 105, 106, and straight and parallel front and rear edges 107, 108.

As shown in FIGS. 10A and 12, base plate 102 of fixture 101 has cut through its thickness dimension a rectangularly-shaped cutting tool shaft guide slot 109 which lies along a fore-and-aft center line of the base plate which is located equidistant between left and right edges 103, 104 of the base plate. As shown in FIG. 12, guide slot 109 has straight and parallel left and right long edges 110, 111 which are disposed in a fore-and-aft direction, perpendicularly to front and rear edges 107, 108 of the base plate. As shown in FIG. 12, cutting tool guide slot 109 has front and rear inwardly concave, arcuately curved or radiused front and rear transversely disposed edges 112, 113 which are located equal distances from front and rear edges 107, 108, respectively, of base plate 102. As shown in FIG. 14, the spacing between front and rear guide slot edges 112, 113 is slightly larger than the diameter of guide cylinder 114 and bore hole into which it is to be inserted.

As shown in FIG. 10A, cutting tool shaft guide slot 109 has a width equal to the diameter of rotary cutting tool shaft 93, and a length which enables substantial fore-and-aft movement of the shaft within the guide slot.

As shown in FIGS. 10A, 10B and 13, fixture 101 of bore hole shaping tool 91 according to the present invention includes a tubular cutting tool shaft guide cylinder 114 which is vertically aligned with the center of guide slot 109 and extends perpendicularly downwards from the lower surface 106 of base plate 102. As shown in FIGS. 10A and 10B, cutting tool shaft guide cylinder 114 has disposed longitudinally therethrough a circular cross-section bore 115 that has a diameter equal to the long, fore-and-aft length dimension of guide slot 109. Also, guide cylinder 114 has at the lower end thereof a circular bottom end plate 116 which has through its thickness dimension a coaxially centered circular clearance hole 117 of the same diameter as that of rotary cutting tool shaft 93, enabling the shaft to freely rotate and move up and down within the clearance hole.

As shown in FIG. 16, guide cylinder 114 has a diameter equal to that of a bore hole 118 which extends perpendicularly inwards from the surface 120 of a concrete body 119 into the body, and a length less than the depth of the bore hole, so that the guide cylinder 114 may be easily inserted into the bore hole, with the lower surface 106 of the base plate 102 of fixture 101 resting on the upper surface 120 of the concrete structure.

Optionally, as shown in FIG. 10C, the semi-cylindrical walls 114A, 114B of guide cylinder 114 may be replaced by a pair of vertically elongated, rectangular plates 114L, 114R, or, as shown in FIG. 10D, by semi-cylindrically-shaped plates 114LC, 114RC. Plates 114L, 114R, 114LC, 144RC preferably are sufficiently wide for outer longitudinal edges thereof to contact the inner wall surface of a bore hole into which guide cylinder 144 is to be inserted, thus constraining the guide cylinder to be coaxially aligned with the bore hole.

Referring again to FIGS. 10A and 10B, it may be seen that guide cylinder 114 has a pair of longitudinally disposed, vertically oriented rectangular front and rear cutting tool shaft clearance slots 121, 122 which penetrate the cylindrical wall 123 of the guide cylinder. The slots 121, 122 extend from the upper surface 123 of bottom end plate 116 to the open upper end 124 of guide cylinder 114. Front and rear clearance slots 121, 122 are vertically aligned with front and rear edges 112, 113 of fore-and-aft guide slot 109 in base plate 102, but are slightly wider.

Referring to FIGS. 10A, 12, 13 and 14, it may be seen that base plate 102 of cutting tool guide fixture 101 has through its thickness an indexing hole 125 and a setting pin hole 124 for aligning the fixture at a particular orientation on the surface of concrete body in which a conventually shaped straight cylindrical bore hole has been previously formed. As shown in FIG. 12, indexing hole 125 and setting pin hole 124 lie on a laterally disposed line centered between front and rear edges 107, 108 of base plate 102, and are laterally spaced equidistant from the center of the base plate. As shown in FIGS. 12 and 13, tool guide fixture 101 is optionally provided with one or more ferrules 126 which are insertable into indexing hole 125. The function of indexing hole 125 and setting pin hole 124 are described below.

Figure 17:
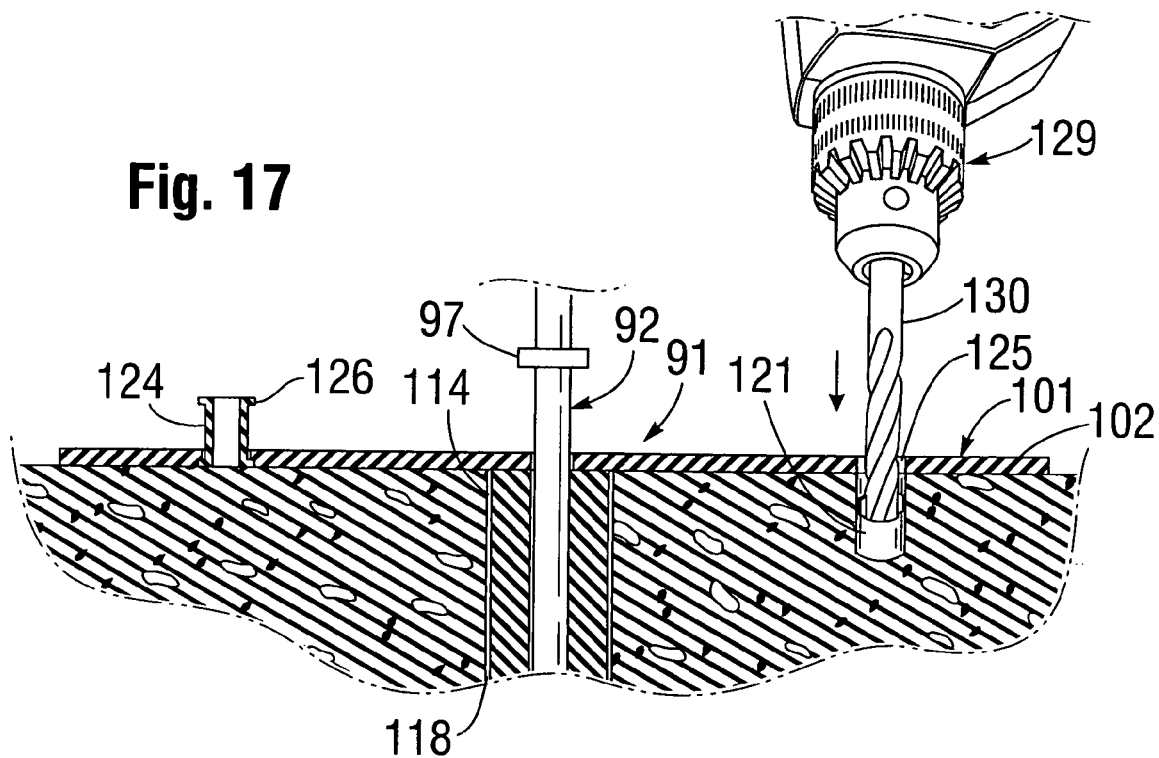
FIG. 17 is a view similar to FIG. 16, showing a base plate of the tool being used as a template to drill a first tool positioning hole in a concrete structure.
Figure 18:
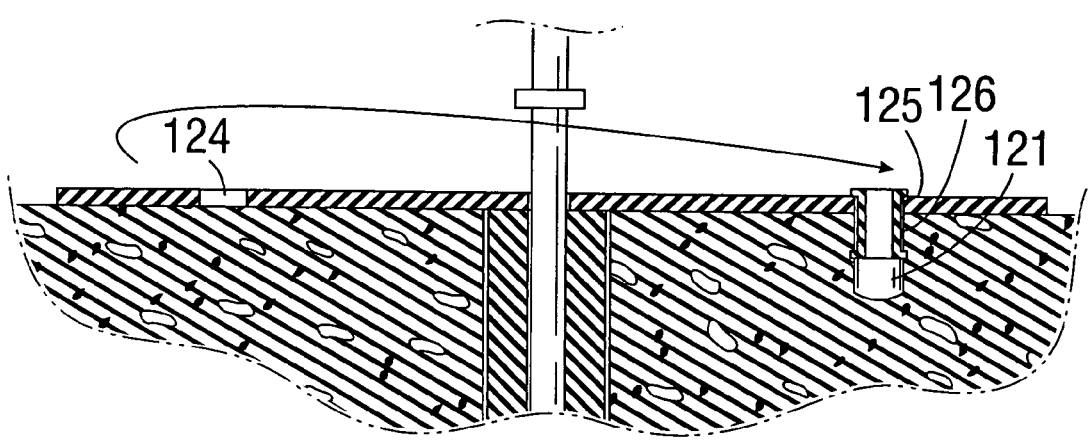
FIG. 18 is a view similar to FIG. 17, showing the base plate orbited 180° and a securing pin inserted into the pre-drilled hole.

FIGS. 15-21 illustrate how concrete bore hole shaping-tool 91 according to the present invention is used. First, as shown in FIG. 15, tool 91 is positioned above a concrete body 120 which has extending perpendicularly into an outer surface 119 thereof an elongated, cylindrically-shaped, uniform circular cross-section bore hole 118 which has been previously bored to a pre-determined depth by conventional means. Next, as shown in FIGS. 15 and 16, cutting tool guide cylinder 114 is inserted downwardly into the bore hole 118 until the lower surface 106 of the tool base plate 102 rests on the upper surface 120 of concrete body 119. Then, as shown in FIG. 17, a first shallow fixture pinning hole 121 is bored into the surface 120 of concrete body 119 by inserting the rotating drill bit 130 of an electric drill 129 perpendicularly downwards into one of the two indexing holes in base plate 102, e.g., right-hand indexing hole 125. Then, base plate 102 is turned 180 degrees and pin 127 is then inserted through indexing hole 125 to retain base plate 102 in place on the surface 102 of concrete body 120, and secure base plate 102 from rotating. Base plate 102 is secured against rotation by physically pressing down on surface 105 of tool 91 either with a user's hand or foot, or mechanically fastening the plate by hole 125 and through-pin 126.

Cutting tool shaft 92 is first pulled up so that collar 97A rests on the bottom surface of circular plate 116. While holding shaft 92 in a raised position while the shaft 92 is rotating, the shaft is first gently rocked to the forward section of slot 109 beginning to bore a tapered hole at just under the location of circular plate 116, while still rotating, the shaft 92 and cutting end 94 are gently moved slowly downward in the direction of the pivoted shaft 92 allowing for cutting end 94 to cut a tapered hole until it is restricted from going any further into hole 118 by collar 97. At this point one half of an elongated oval enlargement of the base of the concrete bore hole has been formed.

Now, once again, shaft 92 is pulled up so that collar 97A rests on the bottom surface of circular plate 116. Then, once again, while holding shaft 92 in a raised position and shaft 92 is rotating, the shaft is first gently rocked to the back section of slot 109, thus beginning the boring of a tapered hole just under the location of circular plate 116. While still rotating, the shaft 92 and cutting end 94 are gently moved slowly downward in the direction of the pivoted shaft 92 allowing cutting end 94 to cut a tapered hole until it is restricted from going any further into hole 118 by collar 97. At this point, a complete generally oval-shaped elongated section of the hole along the major "X:" axis has been formed symmetrically with respect to the center line of the concrete bore hole.

Figure 21:
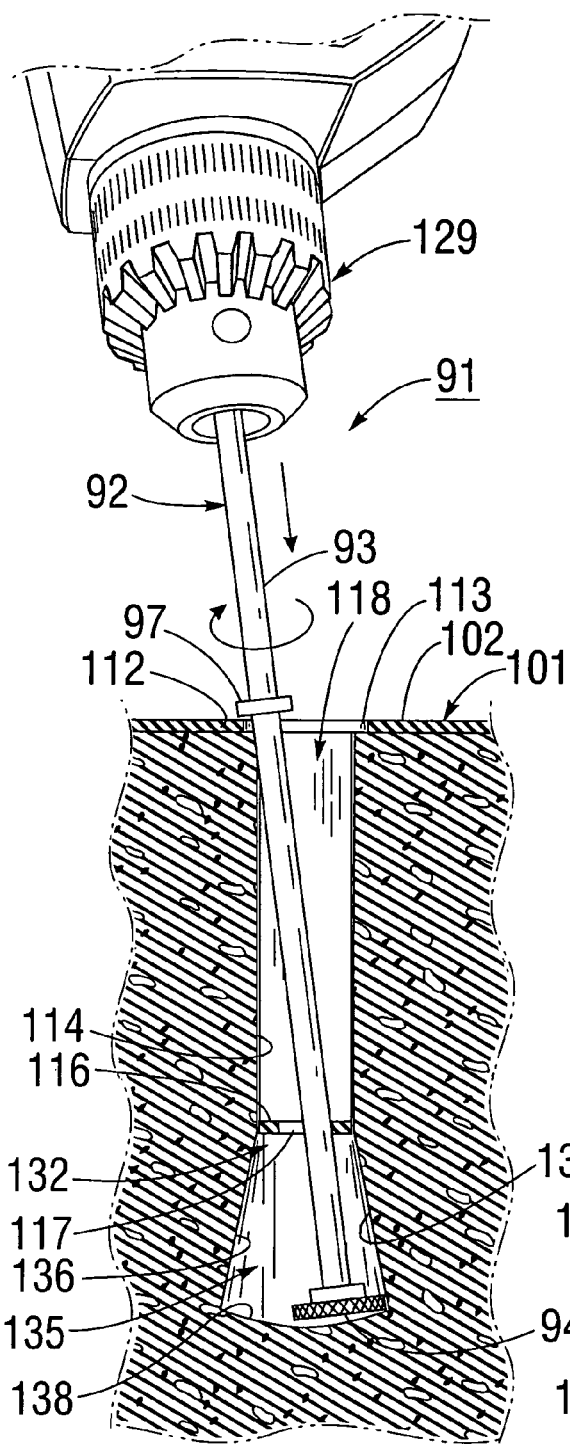
FIG. 21 is a sectional view similar to FIG. 19 but showing the shaft of the cutting wheel tool extended downwardly to its lower collar-limited depth to finish formation of the tapered bore expansion of the lower end of the bore hole.

The combination of fore-and-aft and vertically downward motions of rotary cutting head 94 forms at the lower end of base wall 134 of cylindrical bore hole 118 a radially outwardly tapered generally oval cross-sectional base enlargement 135 or bore 118, along the "X" axis, as shown in FIGS. 21 and 25. As shown in FIG. 21, base enlargement 135 has in vertical medial sectional view the approximate shape of a frustum of a cone, which has radially inwardly tapered side walls 136, 137 that angle inward from the base 138 of the cone to terminate at the upper ends thereof in the straight vertical wall of the originally formed cylindrical bore hole. As shown in FIG. 21, the base 138 has an upwardly concave surface which has a depth measured from the surface 120 of concrete 119 that is limited by stop collar 92 on the shaft 93 or rotary tool 91. Also, as previously mentioned and shown in FIG. 25, the base 137 of base enlargement 134 has a generally oval rather than a circular transverse cross-sectional shape.

The generally oval shape of the elongated concrete bore hole enlargement has the following advantage. When nut 86 is tightened, rotational forces are exerted along interior surface of the elongated bore hole enlargement. Due to the generally oval shape of bore hole enlargement, the fastener can not rotate within that enlargement.

For explanation purposes only, if it were desired to drill a full bell-shaped, enlargement at the bottom of a concrete bore hole, the tool could be rotated 90 degrees and the steps above repeated, thus elongating the bottom of the hole along the "Y" axis.

FIG. 25 illustrates how a perforated base plate of an object such as a lamp standard 140 is attached to the protruding externally threaded shank 55 of fastener 50, using a hexagonal nut 86.

Figure 22:
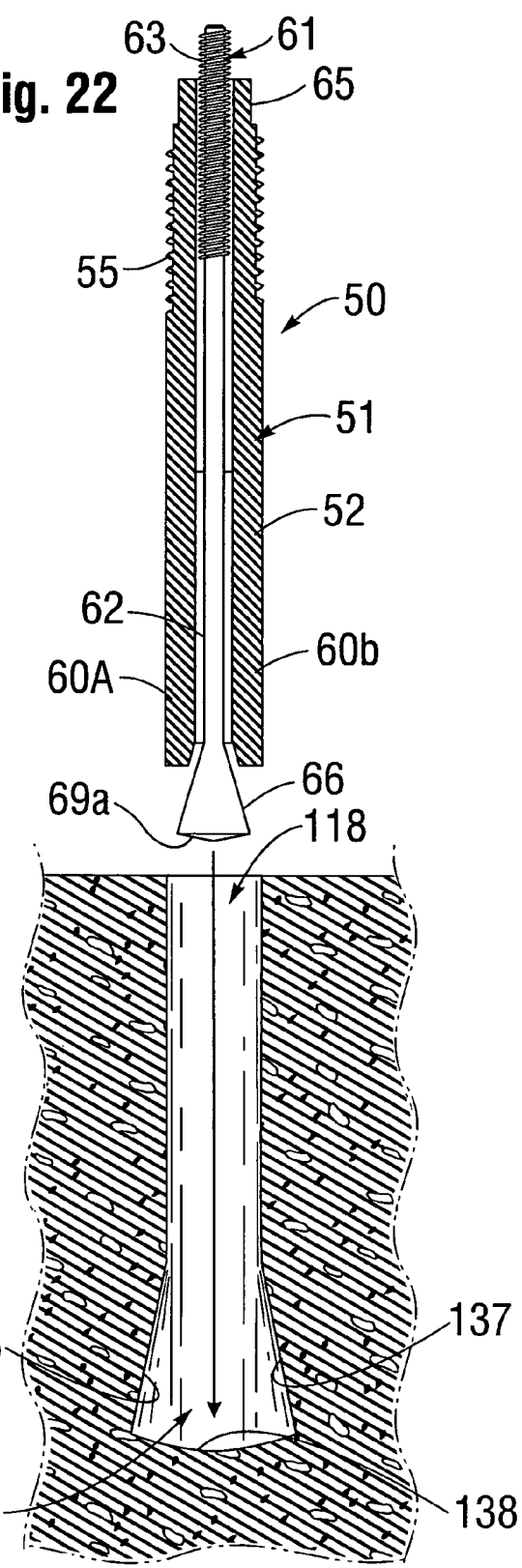
FIG. 22 is a sectional view showing the fastener of FIGS. 6 and 7 positioned above the tapered bore hole formed as shown in FIG. 21, preparatory to installing the fastener in the tapered bore hole.

FIGS. 27-30 illustrate an alternate embodiment 150 of a concrete anchor bolt fastener which is a modification of the impact installable fastener 50 shown in FIGS. 6-9 and described above. Modified concrete anchor bolt fastener 150 is similar to impact installable fastener 50, but is installed by exerting torque on fastener components, rather than exerting impact forces. Thus, as shown in FIG. 28, fastener 150 has an expander head 166 which is tensioned upwardly to thus wedge outwardly against and thus deform outwardly bolt legs 160A, 160B. This tensioning is effected by using a wrench to tighten a hex nut 185 downwardly onto the upper surface of a milled polygonal cross-section bearing collar head 165 located at the upper end of fastener 150 and thus onto the upper annular end wall 156 of an upper externally threaded section 155 of fastener body 151. This tightening action in turn exerts an upward tensional force directed on the threaded upper end 163 of expander shaft 162, thus drawing expander head 166 upwardly into bore 154 of the fastener bolt and thereby causing the expander head to wedge legs 160A, 160B radially outwards, as shown in FIG. 22.

As shown in FIG. 28, upper integral milled bearing collar head 165 of fastener 50 is, in embodiment 150, modified to have a hexagonal external cross-section, which may be engaged by a wrench W2 while torque is applied to nut 185 by a wrench W1, as shown in FIG. 27. Wrench W2 is used to keep bearing collar head 165 irrotatably fixed with respect to the bore hole, thus preventing the tubular body of fastener bolt 150 from rotating in the bore hole and thereby preventing misalignment of expander head 166 and legs 160A, 160 B with the oval enlargement of the base of the bore hole.

What is claimed is:

1. A method for enlarging an inner end of a blind bore hole, said method comprising the step of forming in a transverse base wall at an inner end of an elongated circular cross-section blind bore hole extending inwardly into a solid body from an outer face thereof an oval cross-section enlargement having a major axis larger than a diameter of said circular cross-section blind bore hole, wherein said step of forming said oval cross-section enlargement in said base wall of said blind bore hole is performed using a bore-hole enlargement tool, said tool comprising;
   a. a flat fixture base plate having through its thickness dimension a laterally disposed horizontal slot which has a pair of parallel long side edges terminated at opposite ends thereof a pair of opposed transversely disposed short end edges,
   b. a pair of parallel spaced apart vertical guide members which protrude perpendicularly downwards from said fixture base plate, said vertical guide members having inner facing opposed vertical surfaces adjacent to said long side edges of said slot,
   c. a lower circular end plate joined to lower ends of said vertical guide members, said lower end plate having through its thickness dimension a central circular perforation coaxially aligned with the center of said slot in said fixture base plate, and
   d. a rotary cutting tool having an elongated straight drive shaft which is disposed through the slot and perforation, said cutting tool having at a lower end thereof a rotary cutting head, the drive shaft having a lower stop collar located above the cutting head, and an upper stop collar affixed to the drive shaft above the fixture base plate, the drive shaft being rotatable, and longitudinally movable within said slot and said perforation and pivotable between said short end edges of said slot.

2. A method for fastening an article to a solid body, said method comprising the steps of:
   a. forming in a transverse base wall at an inner end of an elongated circular cross-section blind bore hole extending inwardly into a solid body from an outer face thereof an oval cross-section enlargement having a major axis larger than a diameter of said bore hole, said step of forming said oval cross-section enlargement in said base wall of said bore hole being performed using a bore-hole enlargement tool, said tool comprising;
      i. a flat fixture base plate having through its thickness dimension a laterally disposed horizontal slot which has a pair of parallel long side edges terminated at opposite ends thereof a pair of opposed transversely disposed short end edges,
      ii. a pair of parallel spaced apart vertical guide members which protrude perpendicularly downwards from said fixture base plate, said vertical guide members having inner facing opposed vertical surfaces adjacent to said long side edges of said slot,
      iii. a lower circular end plate joined to lower ends of said vertical guide members, said lower end plate having through its thickness dimension a central circular perforation coaxially aligned with the center of said slot in said fixture base plate, and
      iv. a rotary cutting tool having an elongated straight drive shaft which is disposed through the slot and perforation, said cutting tool having at a lower end thereof a rotary cutting head, the drive shaft having a lower stop collar located above the cutting head, and an upper stop collar affixed to the drive shaft above the fixture base plate, the drive shaft being rotatable, and longitudinally movable within said slot and said perforation and pivotable between said short end edges of said slot.
   b. inserting into said bore hole a fastener, said fastener having at a lower end thereof movable legs expandable into said oval cross-section enlargement of said bore hole and at the upper end thereof a protruding fastener body port,
   c. expanding said legs of said fastener into said oval cross-section enlargement of said bore hole,
   d. positioning a base part of said article on said outer face of said solid body so that the protruding fastener body part protrudes outwardly through a perforation through said base part of said article, and
   e. securing said protruding fastener body part to said base part of said article.

3. The method of claim 2 wherein said vertical guide members of said tool are sections of a cylindrical body separated by a pair of vertically disposed slots which are adjacent to and extend downwards from said short end edges of said horizontal slot in said fixture base plate.

4. The method of claim 2 wherein said vertical guide members of said tool comprise a pair of transversely opposed plates which have a generally flat rectangular shape.

5. The method of claim 2 wherein said tool includes a structure for securing the fixture base plate includes a structure for securing the fixture base plate irrotationaly to a first surface of the body in which the bore hole is to be enlarged.

6. The method of claim 5 wherein said structure of said tool for irrotationally securing said fixture base plate comprises in combination a first hole formed through the thickness dimension of said fixture base plate at a location spaced apart from said rectangular slot through said fixture baser plate, and a pin member insertable through said first hole into a guide hole disposed into said solid body at a location spaced apart from said bore hole in said body.

7. The method of claim 6 wherein said tool includes a second hole formed through said fixture base plate at a location on the opposite side of said slot as said first hole, said first and second holes lying on a straight line through the center of said slot and equidistant therefrom, said second hole having therein a tubular ferrule vertically slidable in said second hole from an upward position downwardly into a guide hole formed in said body.

8. The method of claim 2 wherein said fastener is further defined as
   a. an elongated tubular bolt having extending upwardly from a lower transverse end wall adjacent to an entrance opening in said transverse end wall a longitudinally elongated vertically located rectangular slot which is centered on a diameter of the bolt and has a pair of longitudinally disposed edge which intersect and extend upwardly from said lower transverse end wall to a location between said lower transverse end wall and an upper transverse end wall of said bolt, said slot forming on opposite sides thereof a pair of longitudinally disposed, vertically elongated bolt legs,
   b. a central coaxial shaft bore disposed through the length of said bolt, said shaft bore extending through an upper end face of said bolt and communicating at a lower end thereof with said slot,
   c. an expander member having an elongated cylindrical shaft longitudinally movably located within said shaft bore,
   d. a wedge-shaped expander member head located at a lower end of said shaft and movable upwardly into said slot to forcibly wedge said expander member head into said entrance opening of said slot and thus splay said bolt legs radially apart, and
   e. forcing members for forcibly moving said expander member head into said slot.

9. The method of claim 8 wherein said forcing members of said fastener for forcibly wedging said expander member head into said slot in said lower end wall of said bolt comprise in combination;
   a. an annular ring-shaped impact bushing seated on an upper annular end wall of said bolt, said bushing having through its thickness dimension a longitudinally disposed central hole which receives therethrough an upper end of said expander member shaft, and
   b. a generally cylindrical-shaped impact collar which has extending upwardly into a lower face thereof a blind bore for receiving the upwardly protruding portion of said expander member shaft, said impact collar having an upper surface for receiving impact blows to thereby drive said bolt body downwards relative to said expander member shaft.

10. The method of claim 9 wherein said impact bushing of said fastener is an integral part of said bolt body.

11. The method of claim 8 wherein said forcing members of said fastener for forcibly wedging said expander member head into said slot in said lower end face of said bolt comprises in combination;
   a. an external helically threaded surface on an upper end portion of said expander member shaft,
   b. a bearing collar which seats on an upper annular end wall of said bolt body, said bearing collar having through its thickness dimension a central through-bore which longitudinally slidably receives therethrough the upwardly protruding upper threaded end portion of said expander member shaft, said bearing collar having a flat upper bearing surface, and
   c. an internally threaded nut threadably tightenable onto said protruding threaded portion of said expander member shaft.

12. The method of claim 11 wherein said bearing collar of said fastener has a non-circular external cross-sectional shape.

13. The method of claim 11 wherein said bearing collar of said fastener is an integral part of said bolt body.

14. The method of claim 11 wherein said bearing collar of said fastener has a non-circular external transverse cross-sectional shape.

15. The method of claim 8 wherein at least an upper longitudinally disposed section of said bolt of said fastener has on an exterior surface thereof a helical thread.

16. The method of claim 8 wherein at least a lower longitudinally disposed section of said bolt of said fastener has on an exterior surface thereof a longitudinally spaced apart series of friction enhancing rings.

17. The method of claim 8 wherein an intersecting corner of at least one of said longitudinally disposed edges of said slot of said fastener bolt with said entrance opening in said lower transverse end wall adjacent to said entrance opening of said bolt is beveled.

18. The method of claim 8 wherein said entrance opening in said lower transverse end wall of said bolt is chamfered.

19. The method of claim 8 wherein said expanding member head has a tapered rectangular cross-sectional shape.

\* \* \* \* \*